METHOD OF DEPOSITING EPITAXIAL LAYERS ON A SUBSTRATE FROM THE LIQUID PHASE

Filed Aug. 31, 1973

United States Patent Office 3,825,449

Patented July 23, 1974

3,825,449

METHOD OF DEPOSITING EPITAXIAL LAYERS ON A SUBSTRATE FROM THE LIQUID PHASE

Donald Paul Marinelli, Trenton, N.J., and Thomas Edward Stockton, Cornwells Heights, Pa., assignors to RCA Corporation Filed Aug. 31, 1973, Ser. No. 393,627
Int. Cl. H01l 7/38
U.S. Cl. 148—172 5 Claims

ABSTRACT OF THE DISCLOSURE

The surface of the substrate on which the epitaxial layer is to be deposited is coated along at least one edge portion with a strip of a non-reactive material. An epitaxial layer is then deposited on the substrate by conventional liquid phase techniques by moving the substrate through a suitable deposition solution with the substrate preferably oriented so as to make the strip-coated edge the leading edge.

BACKGROUND OF THE INVENTION

The invention herein disclosed was made in the course of or under a contract or subcontract thereunder with the Department of the Navy.

The present invention relates to a method of depositing on a substrate epitaxial layers of a single crystalline material by the liquid phase deposition technique while preventing dendritic growth of the deposited material along at least a portion of the edge of the substrate.

U.S. Pat. No. 3,565,702 to H. Nelson, issued February 23, 1971, entitled "Depositing Successive Epitaxial Semiconductive Layers From The Liquid Phase" describes a method and apparatus for depositing a plurality of epitaxial layers in sucession by liquid phase epitaxy. It has been found that during the deposition of the epitaxial layer, there is a strong tendency for spurious dendritic growth to occur along the edge of the substrate. Although this dendritic growth is confined to a small area at the edge of the substrate, the thickness of the dendritic growth above the surface of the substrate can be relatively large, as much as 75 to 100 $\mu m$. The dendritic growth at the edge of the substrate has little adverse effect on the growth of the epitaxial layer of which it is a part. However, this dendritic growth is subject to being broken off during the epitaxy process, whereby the particles thereof can scratch the surface of the epitaxial layer of which it is a part and thus damage that layer, which in turn can adversely affect the crystalline characteristics of the next succeeding epitaxial layer. Also, if the particles of the dendritic growth remain on the surface of the epitaxial layer, these particles will adversely affect proper deposition of the next succeeding epitaxial layer. Therefore, in order to eliminate the problems which the dendritic growth particles can cause, it would be desirable to prevent the spurious dendritic growth.

SUMMARY OF THE INVENTION

An epitaxial layer of a single crystalline material is deposited on the surface of a substrate without dendritic growth of the material at the edge of the surface of the substrate by coating an edge portion of the surface of the substrate with a narrow strip of a non-reactive material. An epitaxial layer of the single crystalline material is then deposited on the uncoated portion of the substrate from a solution containing the material.

DETAILED DESCRIPTION

Figure 1:
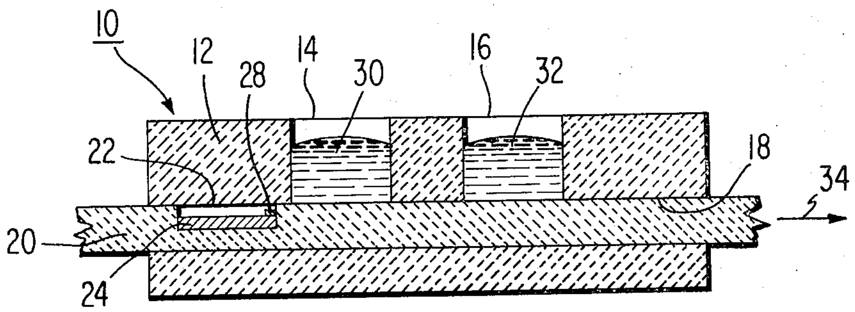
FIG. 1 is a cross-sectional view of a form of an apparatus suitable for carrying out the method of the present invention.

Referring to FIG. 1, a form of an apparatus suitable for carrying out the method of the present invention is generally designated as 10. The apparatus 10 comprises a refractory furnace boat 12 of an inert refractory material, such as graphite. The boat 12 has a pair of spaced wells 14 and 16 in its upper surface. A passage 18 extends longitudinally through the boat 12 from one end to the other end and extends across the bottoms of the wells 14 and 16. A slide 20 of a refractory material, such as graphite, moveably extends through the passage 18 so that the top surface of the slide forms the bottom surfaces of the wells 14 and 16. The slide 20 has a substrate receiving recess 22 in its top surface.

Figure 2:
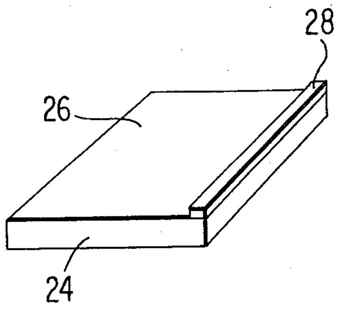
FIGS. 2, 3, and 4 are perspective views of a device at various stages of the method of the present invention.

To carry out the method of the present invention, a flat substrate 24 is coated on a flat surface 26 with a narrow strip 28 of a non-reactive material (see FIG. 2). By "non-reactive material" it is meant a material which will not nucleate epitaxial growth and which is impervious to the deposition solution. Such materials are well known and include, e.g., silicon oxide, silicon nitride and aluminum oxide. The strip 28 is coated on the surface 26 adjacent at least a portion of the edge of the substrate. The strip 28 may be coated on the substrate 24 by any well-known technique, such as by vacuum evaporation through a suitable mask. The substrate 24 is mounted in the recess 22 in the slide with the surface 26 facing upwardly and being substantially parallel to the top surface of the slide 20. Also, the substrate 24 is preferably positioned in the recess 22 so that the edge of the substrate along which the strip 28 extends is the leading edge with regard to the direction that the slide 20 will be moved, as will be described later. The slide 20 with the substrate 24 in the recess 22 is positioned so that the recess 22 is adjacent but outside the well 14.

Separate charges are placed in each of the wells 14 and 16. Each of the charges is a mixture of the material of the epitaxial layer to be deposited and a solvent for the material. If the epitaxial layers to be deposited are of a semiconductor material and each of the epitaxial layers is to be of a particular conductivity type, a conductivity modifier is included in each of the charges. For example, to deposit epitaxial layers of gallium arsenide, the material in the charge would be gallium arsenide, the solvent could be gallium, and the conductivity modifier, if used, could be either tellurium or tin for an N type layer or zinc, germanium, or magnesium for a P type layer.

The loaded furnace boat 12 is then placed in a furnace tube (not shown) and a flow of high purity hydrogen is provided through the furnace tube and over the furnace boat 12. Heating means for the furnace tube is turned on to heat the contents of the furnace boat 12 to a temperature at which the solvent in each of the charges is molten and the other ingredients in the charges dissolve in the molten solvent. For example, if the material in each of the charges is gallium arsenide and the solvent is gallium, the furnace boat can be heated to a temperature of between 800° C. and 950° C. This temperature is maintained long enough to ensure complete melting and homogenization of the ingredients of the charges. Thus, the charges become first and second solutions 30 and 32 of the material and any conductivity modifier in the molten solvent.

Figure 3:
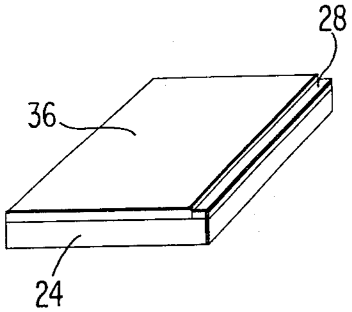

The slide 20 is then moved in the direction of the arrow 34 until the substrate 24 is within the well 14. This brings the substrate surface 26 and the inorganic strip 28 into contact with the first solution 30. The temperature of the furnace tube is then lowered to cool the furnace boat 12 and its contents. Cooling the first solution 30 causes some of the material in the solution to precipitate and deposit on the uncoated substrate surface 26 as a first epitaxial layer 36, as shown in FIG. 3. However, little, if any, of the material will deposit on the strip 28.

Figure 4:
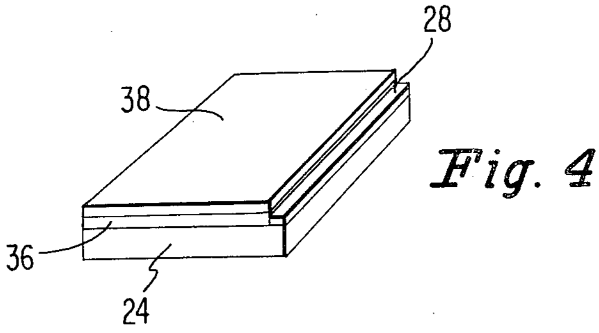

The slide 20 is then again moved to move the substrate 24 with the first epitaxial layer 36 thereon out of the well 14 and into the well 16. This brings the surface of the first epitaxial layer 36 into contact with the second solution 32. The temperature of the furnace tube is lowered further to further cool the furnace boat 12 and its contents. Cooling the second solution 32 causes some of the material in the second solution to precipitate and deposit on the first epitaxial layer 36 as a second epitaxial layer 38, as shown in FIG. 4. However, again little, if any, of the material from the solution will deposit on the strip 28. The slide 20 is then again moved in the direction of the arrow 34 to move the substrate 24 with the two epitaxial layers 36 and 38 thereon from the well 16.

When the first epitaxial layer 36 is deposited on the substrate 24, there may be dendritic growth of the material of the epitaxial layer along the edges of the substrate except the edge along which the strip 28 extends. We have found that the strip 28, by its masking properties, prevents the normal dendritic growth of the material of the epitaxial layer 36, along the edge of the substrate 24 along which the strip 28 extends. In addition, dendritic growth along the junction between the epitaxial layer 36 and the strip 28 is suppressed. Since the strip 28 extends preferably along the leading edge of the substrate with regard to the direction of movement of the slide 20, when the slide 20 is moved to carry the substrate 24 from the well 14 to the well 16, there is no dendritic growth along the leading edge of the substrate which can be broken off. Thus, by providing the strip 28 along the leading edge of the substrate, there is eliminated the problem of adverse effects to the deposition of the second epitaxial layer 38 because of dendritic particles on the first epitaxial layer 36.

Although dendritic growth along the edge portion of the substrate other than the leading edge does not generally cause the same problem with the same degree of severity as dendritic growth along the leading edge, the strip 28 may be provided along other than the leading edge of the substrate to still gain a benefit by insuring no adverse effects by the dendritic growth. Although the substrate 24 is shown as having a rectangular flat surface 26, the method of the present invention can be used on flat substrates having any shape of flat surface.

Although the method of the present invention has been described with regard to a furnace boat in which the wells containing the solutions are in a straight alignment and the support carrying slide extends longitudinally through the furnace boat, the method can also be used with a furnace boat in which the wells are arranged in a circle and the substrate carrying slide rotates beneath the wells. In addition, the method of the present invention can be used with a furnace boat having more than three solution containing wells to deposit more than two epitaxial layers in succession.

We claim:

1. A method of depositing an epitaxial layer of a single crystalline material on the surface of a substrate without dendritic growth of the material at at least a portion of the edge of the surface of the substrate comprising the steps of coating an edge portion of the surface of the substrate with a narrow strip of a non-reactive material, and depositing an epitaxial layer of the single crystalline material on the uncoated portion of the surface of the substrate from a solution containing the material.

2. In a method of depositing on a surface of a substrate a plurality of epitaxial layers of a single crystalline material in succession using a furnace boat having a plurality of spaced wells, a separate solution of the material to be deposited in a molten solvent in at least two of the wells, and a substrate carrier slide extending and moveable across the bottoms of the wells, wherein the substrate is mounted on the slide, the slide is moved to bring the substrate into each well containing a solution in succession, and while the substrate is in each of the wells, an epitaxial layer is deposited on the surface of the substrate from the solution, the improvement of prior to mounting the substrate on the slide, coating the said surface of the substrate with a narrow strip of a non-reactive material which extends along at least a portion of the edge of the surface of the substrate, mounting the substrate on the slide so that the edge of the substrate which is the leading edge with regard to the movement of the slide has the strip extending therealong, and the epitaxial layers are deposited on the uncoated portion of the surface of the substrate, said strip preventing dendritic growth of the material at the edge of the epitaxial layers which extend along the inorganic strip.

3. The method of claim 2 in which the strip is provided along the edge portions of the surface of the substrate which are adjacent the leading edge portion as well as the leading edge portion.

4. The method of claim 2 in which the strip is provided along the entire length of the edge of the surface of the substrate.

5. The method of claim 2 in which the strip is of an inorganic material selected from the group consisting of silicon oxide, silicon nitride, and aluminum oxide.

References Cited

UNITED STATES PATENTS

| | | | |
|---|---|---|---|
| 3,578,513 | 5/1971 | Pilkuhn et al. | 148—171 |
| 3,647,578 | 3/1972 | Barnett et al. | 148—171 |
| 3,697,336 | 10/1972 | Lamorte | 148—171 |
| 3,715,245 | 2/1973 | Barnett et al. | 148—171 |

GEORGE T. OZAKI, Primary Examiner

U.S. Cl. X.R.

117—201; 148—171, 173, 1.5